United States Patent
Xue et al.

(10) Patent No.: US 11,570,806 B2
(45) Date of Patent: Jan. 31, 2023

(54) CONDITIONAL CONFIGURED GRANT (CG) OCCASIONS FOR UPLINK TRANSMISSION

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Tao Luo, San Diego, CA (US); Sony Akkarakaran, Poway, CA (US); Rajat Prakash, San Diego, CA (US); Ozcan Ozturk, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 33 days.

(21) Appl. No.: 17/112,400

(22) Filed: Dec. 4, 2020

(65) Prior Publication Data
US 2022/0183046 A1 Jun. 9, 2022

(51) Int. Cl.
*H04W 72/14* (2009.01)
*H04L 1/08* (2006.01)
*H04W 28/26* (2009.01)

(52) U.S. Cl.
CPC ............... *H04W 72/14* (2013.01); *H04L 1/08* (2013.01); *H04W 28/26* (2013.01)

(58) Field of Classification Search
CPC ..... H04W 72/04; H04W 72/12; H04W 72/14; H04W 72/042; H04W 72/1284; H04W 72/0446; H04W 72/1289; H04W 72/0413; H04W 72/0453; H04W 76/27; H04W 4/40; H04W 4/44; H04W 4/46; H04L 1/08; H04L 1/1812; H04L 1/1819; H04L 1/1887
See application file for complete search history.

(56) References Cited

U.S. PATENT DOCUMENTS

| | | | |
|---|---|---|---|
| 2018/0049193 A1* | 2/2018 | Belleschi | H04W 72/0446 |
| 2018/0288746 A1 | 10/2018 | Zhang et al. | |
| 2019/0182840 A1 | 6/2019 | Feng et al. | |
| 2019/0230689 A1 | 7/2019 | Cao et al. | |
| 2020/0259896 A1 | 8/2020 | Sachs et al. | |
| 2021/0144750 A1* | 5/2021 | Cao | H04W 72/14 |
| 2021/0344467 A1* | 11/2021 | Hooli | H04W 76/14 |
| 2021/0352640 A1* | 11/2021 | Fan | H04L 5/0044 |
| 2022/0052787 A1* | 2/2022 | Fu | H04L 1/08 |

OTHER PUBLICATIONS

International Search Report and Written Opinion—PCT/US2021/072374—ISA/EPO—dated Feb. 28, 2022.

* cited by examiner

*Primary Examiner* — Peter Chen
(74) *Attorney, Agent, or Firm* — Patterson+ Sheridan, L.L.P.

(57) ABSTRACT

Certain aspects of the present disclosure provide techniques for sending a configuration for conditional configured grant (CG) occasions for uplink transmission to a user equipment (UE). Each conditional CG occasion may be associated with multiple conditional CG resources. Each conditional CG resource may be associated with a sending window. The UE may monitor within sensing windows for conditional CG resources of a certain conditional CG occasion for over the air (OTA) signals from other UEs to determine if the conditional CG resources are available for uplink transmission. The UE may skip the conditional CG occasion when the conditional CG resources are not available. The UE may perform uplink transmission on the conditional CG resources when the conditional CG resources are available.

27 Claims, 17 Drawing Sheets

CONDITIONAL CONFIGURED GRANT (CG) OCCASIONS FOR UPLINK TRANSMISSION

BACKGROUND

Field of the Disclosure

Aspects of the present disclosure relate to wireless communications, and more particularly, to techniques for configuring a user equipment (UE) with conditional configured grant (CG) occasions for uplink transmission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

Systems, methods, and devices of the present disclosure each have several aspects, no single one of which is solely responsible for its desirable attributes. Without limiting the scope of this disclosure as expressed by claims which follow, some features will now be discussed briefly. After considering this discussion, and particularly after reading the section entitled "Detailed Description" one will understand how the features of this disclosure provide advantages that include improved and efficient techniques to configure a user equipment (UE) with conditional configured grant (CG) occasions for uplink transmission.

Certain aspects of the subject matter described in this disclosure can be implemented in a method for wireless communication by a UE. The method generally includes receiving, from a network entity, a configuration for conditional CG occasions for uplink transmission, each conditional CG occasion having multiple conditional CG resources; monitoring, within sensing windows configured for the conditional CG resources, for over the air (OTA) signals from one or more other UEs to determine if one or more of the conditional CG resources of a conditional CG occasion are available; and deciding whether to skip the conditional CG occasion or perform uplink transmission on the one or more of the conditional CG resources, based on the monitoring.

Certain aspects of the subject matter described in this disclosure can be implemented in a method for wireless communication by a network entity. The method generally includes generating a configuration for conditional CG occasions for uplink transmission, each conditional CG occasion having multiple conditional CG resources; and sending, to a UE, the configuration to: monitor within sensing windows configured for the conditional CG resources, for OTA signals from one or more other UEs to determine if one or more of the conditional CG resources of a conditional CG occasion are available; and decide whether to skip the conditional CG occasion or perform uplink transmission on the one or more of the conditional CG resources, based on the monitoring.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
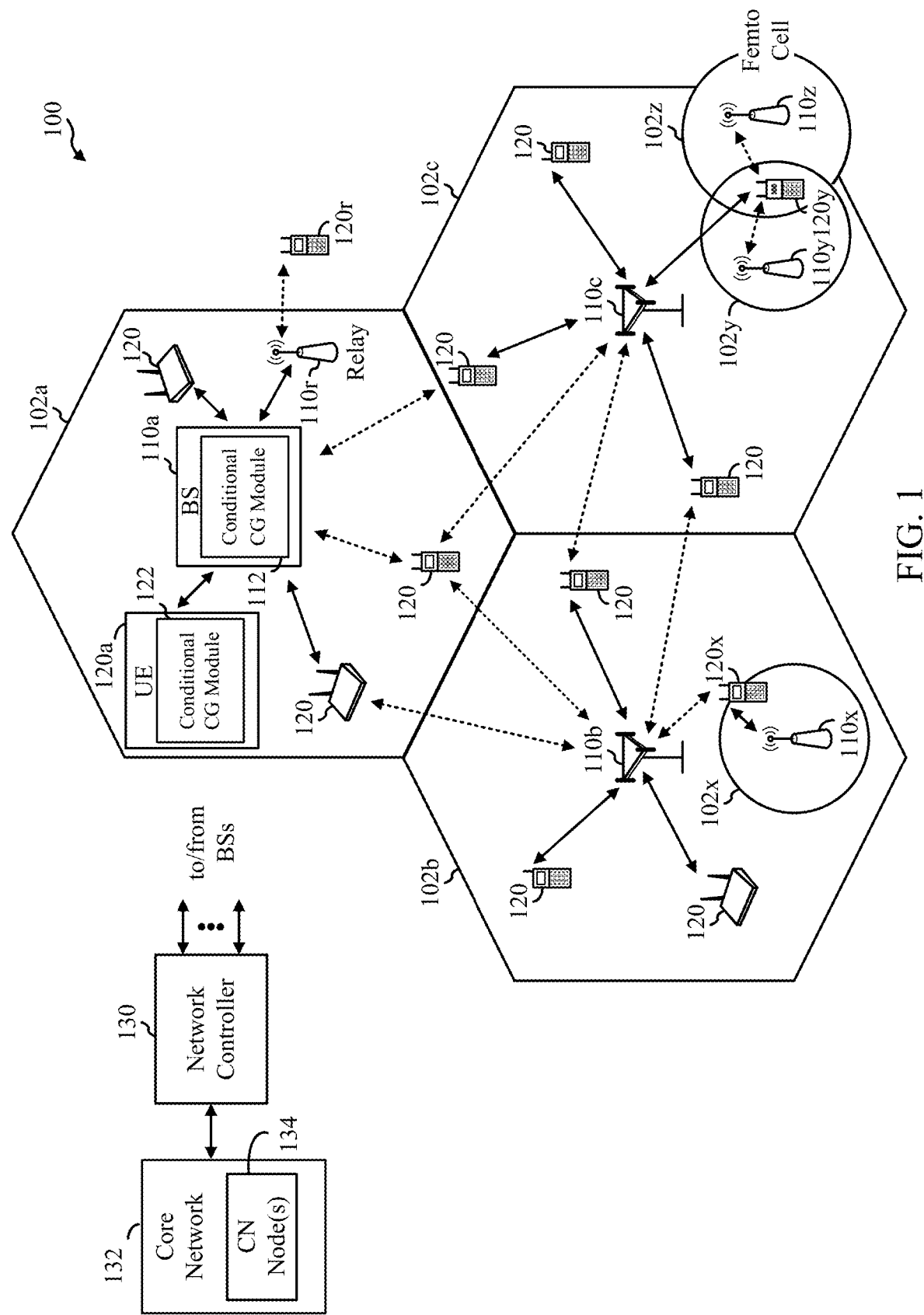
FIG. 1 is a block diagram conceptually illustrating an example telecommunications system, according to aspects of the present disclosure.

Aspects of the present disclosure provide apparatus, methods, processing systems, and computer readable mediums for techniques to configure a user equipment (UE) with conditional configured grant (CG) occasions for uplink transmission. Each conditional CG occasion may be associated with conditional CG resources. Each conditional CG resource may be associated with a sensing window.

The UE may monitor within sensing windows for conditional CG resources of a conditional CG occasion for over the air (OTA) signals from other UEs to determine if the conditional CG resources are available for uplink transmission. The UE may skip the conditional CG occasion when the conditional CG resources are not available. The UE may perform uplink transmission on the conditional CG resources when the conditional CG resources are available.

The following description provides examples of conditional CG for uplink transmission, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

The teachings herein may be incorporated into (e.g., implemented within or performed by) a variety of wired or wireless apparatuses (e.g., nodes). In some aspects, a wireless node implemented in accordance with the teachings herein may comprise an access point (AP) or an access terminal (AT).

The AP may comprise, be implemented as, or known as a node B (NB), a radio network controller (RNC), an evolved node B (eNB), a base station controller (BSC), a base transceiver station (BTS), a base station (BS), a transceiver function (TF), a radio router, a radio transceiver, a basic service set (BSS), an extended service set (ESS), a radio base station ("RBS"), an integrated access and backhauling (IAB) node (e.g., an IAB donor node, an IAB parent node, and an IAB child node), or some other terminology.

The AT may comprise, be implemented as, or known as a subscriber station, a subscriber unit, a mobile station, a remote station, a remote terminal, a user terminal, a user agent, a user device, a user equipment (UE), a user station, or some other terminology. In some implementations, the AT may comprise a cellular telephone, a cordless telephone, a session initiation protocol (SIP) phone, a wireless local loop (WLL) station, a personal digital assistant (PDA), a handheld device having wireless connection capability, a station (STA), or some other suitable processing device connected to a wireless modem (such as an augmented reality (AR)/virtual reality (VR) console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

In some aspects, the node is a wireless node. Such wireless node may provide, for example, connectivity for or to a network (e.g., a wide area network such as the Internet or a cellular network) via a wired or wireless communication link.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Example Telecommunications System

FIG. 1 illustrates an example wireless communication network 100, in which aspects of the present disclosure may be practiced. For example, the wireless communication network 100 may include one or more user equipments (UEs) 120a (with a conditional configured grant (CG) module 122) configured to perform operations 500 of FIG. 5 and/or one or more base stations (BSs) 110a (with a conditional CG module 112) configured to perform operations 600 of FIG. 6.

The wireless communication network 100 is in communication with a core network 132. The core network 132 is in communication with the one or more BSs 110 that and/or the one or more UEs 120 in the wireless communication network 100, via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 may communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

The wireless communication network 100 may include relay stations (not shown). A relay station is a station that receives a transmission of data and/or other information from an upstream station (e.g., the BS 110 or the UE 120) and sends a transmission of the data and/or other information to a downstream station (e.g., the UE 120 or the BS 110). The relay station may also be the UE 120 that relays transmissions for other UEs 120. In the example shown in FIG. 1, a relay station may communicate with the BS 110a and a UE 120r in order to facilitate communication between the BS 110a and the UE 120r. The relay station may also be referred to as an IAB node, a relay AP, a relay, etc.

The wireless communication network 100 may be a heterogeneous network that includes BSs 110 of different types, e.g., macro AP, pico AP, femto AP, relays, etc. These different types of BSs 110 may have different transmit power levels, different coverage areas, and different impact on interference in the wireless communication network 100. For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the BSs 110 may have similar frame timing, and transmissions from the different BSs 110 may be approximately aligned in time. For asynchronous operation, the BSs 110 may have different frame timing, and transmissions from the different BSs 110 may not be aligned in time. The techniques described herein may be used for both synchronous and asynchronous operation.

Figure 2:
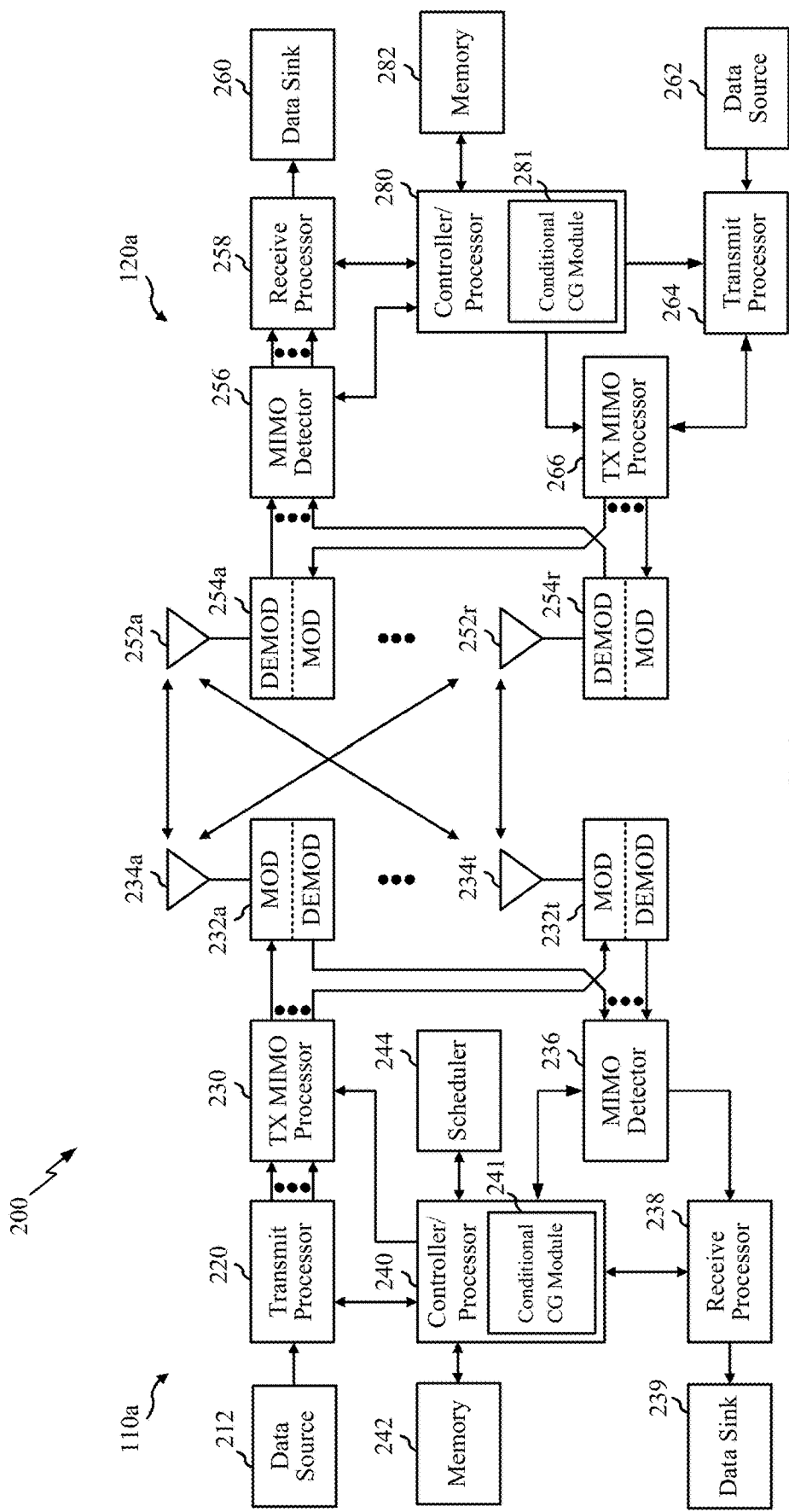
FIG. 2 is a block diagram conceptually illustrating a design of an example base station (BS) and a user equipment (UE) in a telecommunication system, according to aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via antennas 234a-234t, respectively.

At the UE 120a, antennas 252a-252r may receive the downlink signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for a physical uplink shared channel (PUSCH)) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs for 120 data transmission on a downlink and/or an uplink.

Antennas 252, processors 266, 258, 264, and/or controller/processor 280 of the UE 120a and/or antennas 234, processors 220, 230, 238, and/or controller/processor 240 of the BS 110a may be used to perform various techniques and methods described herein for conditional CG based uplink transmission. For example, as shown in FIG. 2, the controller/processor 240 of the BS 110a includes a conditional CG module 241 that may be configured to perform the operations illustrated in FIG. 6, as well as other operations disclosed herein for conditional CG based uplink transmission, in accordance with aspects of the present disclosure. As shown in FIG. 2, the controller/processor 280 of the UE 120a includes a conditional CG module 281 that may be configured to perform the operations illustrated in FIG. 5, as well as other operations disclosed herein for conditional CG based uplink transmission, in accordance with aspects of the present disclosure. Although shown at the controller/processor, other components of the UE 120a and the BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
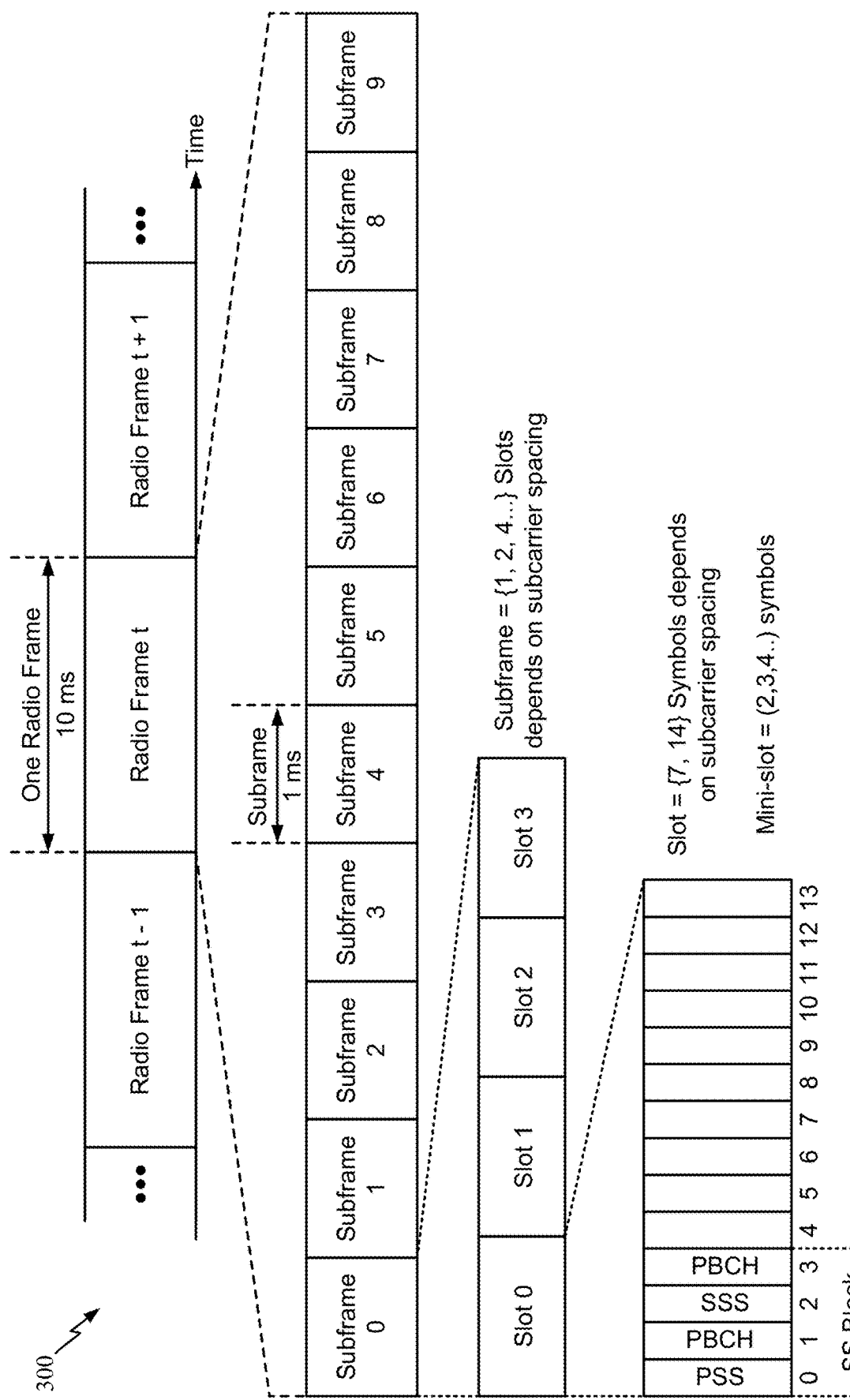
FIG. 3 is an example frame format for new radio (NR), according to aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

The SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may broadcast both SSB and remaining minimum system information (RMSI), for example, with SIB1 and SIB2. A non-standalone cell may only broadcast SSB, without broadcasting RMSI. In a single carrier in NR, multiple SSBs may be sent in different frequencies, and may include the different types of SSb.

Example SPS PDSCH Configuration

Semi-persistent scheduling (SPS) resource allocation, which is sometimes called configured downlink assignment, refers to a scheduling technique where a user equipment (UE) is pre-configured by a base station (BS) with a periodicity and an offset.

Figure 4:
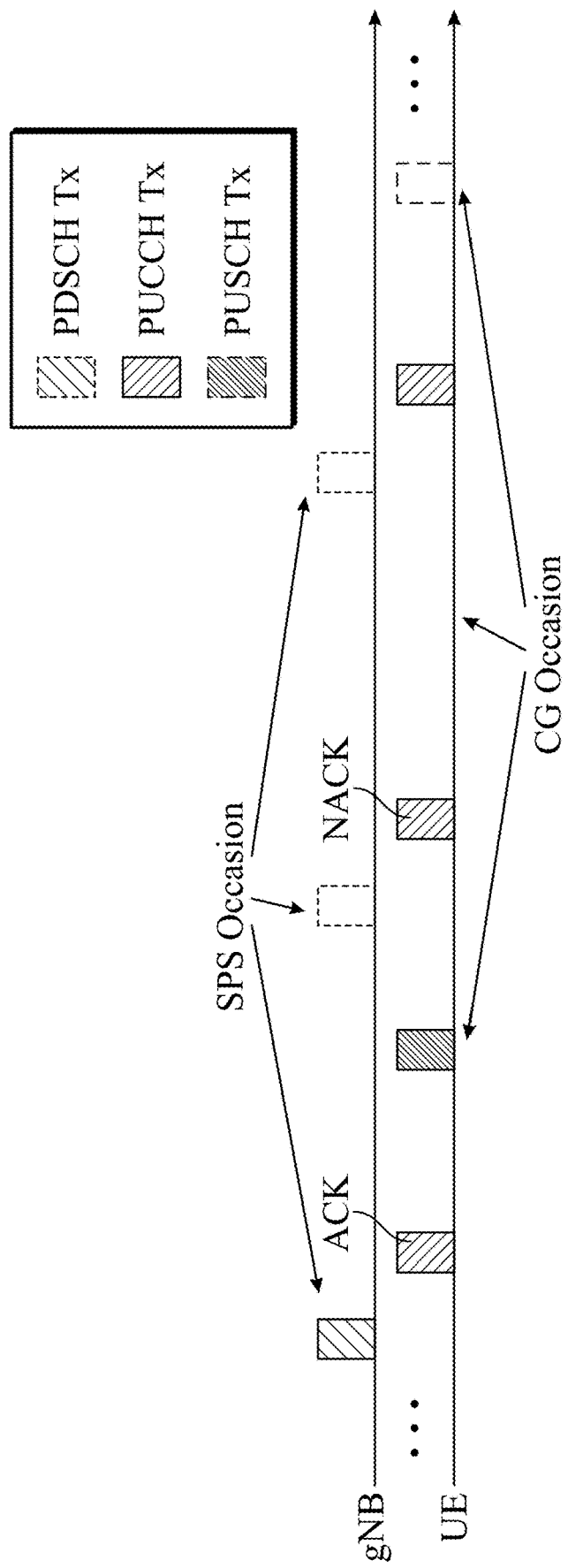
FIG. 4 illustrates an example of semi-persistent scheduled (SPS) and configured grant (CG) occasions, according to aspects of the present disclosure.

As illustrated in FIG. 4, pre-configured with SPS, SPS occasions repeat according to a pre-configured periodicity, resulting in periodic SPS occasions. For SPS, the BS may use radio resource control (RRC) signaling to define the periodicity of configured downlink assignments. Similarly, once configured with configured grant (CG) occasions, the CG occasions may repeat according to the pre-configured periodicity.

As used herein, the term occasion generally refers to a time in which resources are allocated for a transmission that may or may not ultimately happen. For example, a downlink transmission may or may not occur in SPS occasions. Similarly, an uplink transmission may or may not occur in CG occasions. Occasions may be considered activated if the transmission may occur and, thus, those occasions should be monitored.

In some cases, multiple UEs may share periodic CG uplink resources. The CG resources may reduce resource overhead associated with scheduling dynamically allocated resources. The CG resources may also reduce latency by eliminating packet transmission delay for a scheduling request procedure.

The CG resources may be used in internet of things (IOT) or machine type communications (MTC) applications where the uplink payloads may be static in size, relatively small, and periodic. For example, the IOT or MTC devices may periodically provide measurements or status updates (e.g., a vehicle providing status updates) in communication with a radio access network (RAN).

In Rel'15 and 16, the CG has been specified to allow data transmission via what may be considered an "arrive-and-go" technique. For example, the UE may receive a data packet (the date packet arrives) and then transmit the data packet (the packet goes) on the CG resources over a next CG occasion. These CG resources may be orthogonal. The BS may allocate these CG resources to the UE. The BS may not re-allocate these CG resources for some other purpose.

CG configurations may be difficult to implement for certain deployments, such as industrial IOT applications where numerous RedCap UEs are deployed (e.g., networks where there are a high number of UEs (such as smart wearables, video surveillance devices, and wireless sensors) associated with a somewhat random traffic arrival at the BS, a time-varying traffic arrival density, a lower data rate, a relaxed latency, etc.). Also, in some deployments, a high number of UEs with the CG configurations may consume an excessively high amount of physical uplink shared channel (PUSCH) resources, resulting in a considerable portion of these resources being wasted, which in turn reduces system capacity. Unlike semi-persistent scheduling (SPS) downlink case, this type of uplink waste cannot be addressed by scheduling, as the BS does not know exactly when traffic will arrive from the UE and hence cannot dynamically re-schedule these resources for other purpose.

To support a high number of UEs for dynamic uplink traffic together with moderate latency requirement (such as 5-10 ms), the BS may use statistical multiplexing schemes for regulating uplink CG resource access among multiple UEs. This may also prevent any waste of CG resources. The statistical multiplexing schemes may involve spreading control and overloading control. Spreading control relates to substantially uniformly distributing traffic (as interference to others) into a resource pool of the CG resources. Overloading control relates to controlling a level of multiplexing within a stable region (e.g., too aggressive multiplexing may result in virtually un-usable of the resource pool).

In one such scheme, a CG resource pool may be shared by UEs. The BS may control access of the UEs to this CG resource pool to avoid over-loading due to dynamic and random arrival of data traffic. For example, the BS may issue an online command to adaptively adjust a probability of the UEs to access a CG occasion. The BS may also issue a threshold and the UE may access the CG resource pool within the threshold to prevent potential overloading. This scheme may provide scalability with respect to network deployments (e.g., industrial IOT, etc.) with a high capacity in an adaptive and flexible manner without the associated capacity loss that would occur if dedicated CG resources were assigned to each respective UE.

In another such scheme, channel busy ratio (CBR) and channel occupancy ratio (CR) based control is utilized in sidelink to access a CG resource pool (e.g., each sidelink UE autonomously measures CBR and CR, and regulates its channel use following a guidance of the BS/pre-configuration). This scheme may allow sidelink UEs to access the CG resource pool based on these CBR and CR measurements.

Example Conditional Configured Grant (CG) for Uplink Transmission

Aspects of the present disclosure relate to wireless communications, and more particularly, to conditional configured grant (CG) occasions for uplink transmission. A user equipment (UE) configured with a conditional CG occasion may directly monitor for over the air (OTA) signals from other UEs for the conditional CG occasion. The UE may skip the conditional CG occasion if the UE detects OTA signals from other UEs. This may help the UE to save power, as the UE may avoid wasting its transmission processing power in sending data over this conditional CG occasion, which is also accessed by other UEs.

Figure 5:
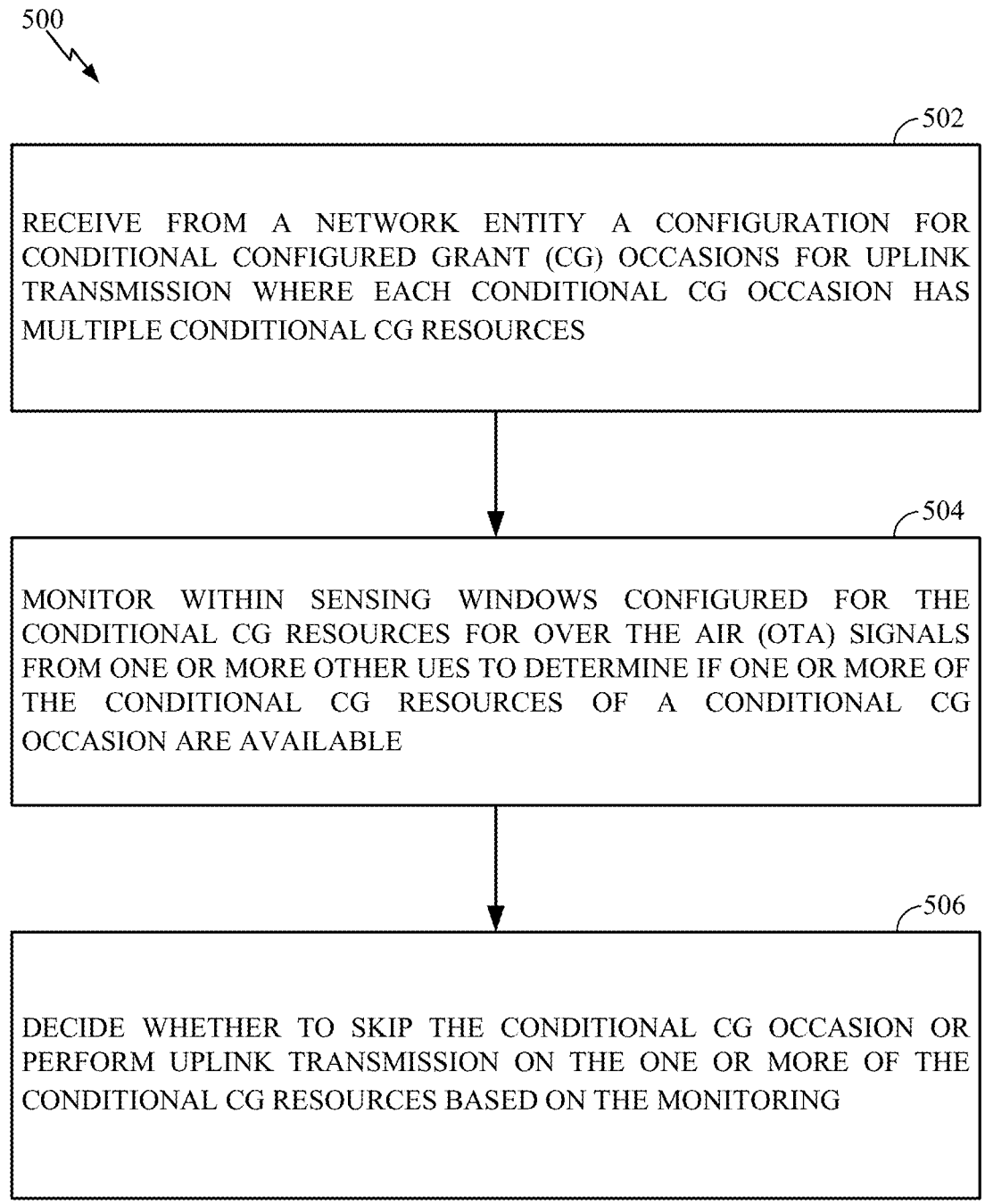
FIG. 5 illustrates example operations for wireless communication by a UE, according to aspects of the present disclosure.

FIG. 5 is a flow diagram illustrating example operations 500 for wireless communication. Operations 500 may be performed by a UE (e.g., such as the UE 120a in FIG. 1 or FIG. 2) to execute conditional CG based uplink transmission, in accordance with aspects of the present disclosure.

Operations 500 begin, at 502, by receiving from a network entity (e.g., such as the BS 110a of FIG. 1 or FIG. 2) a configuration for conditional CG occasions for uplink transmission. Each conditional CG occasion has multiple conditional CG resources. In certain aspects, the UE receives the configuration using antenna(s) and receiver/transceiver components of the UE 120a shown in FIG. 1 or FIG. 2 and/or of the apparatus shown in FIG. 16.

At 504, the UE monitors within sensing windows configured for the conditional CG resources for OTA signals from one or more other UEs to determine if one or more of the conditional CG resources of a conditional CG occasion are available. In certain aspects, the UE monitors for the OTA signals within the sensing windows for the conditional CG resources using a processor of the UE 120a shown in FIG. 1 or FIG. 2 and/or of the apparatus shown in FIG. 16.

At 506, the UE decides whether to skip the conditional CG occasion or perform uplink transmission on the one or more of the conditional CG resources, based on the monitoring. In certain aspects, the UE performs the uplink transmissions using antenna(s) and transmitter/transceiver components of the UE 120a shown in FIG. 1 or FIG. 2 and/or of the apparatus shown in FIG. 16.

Figure 6:
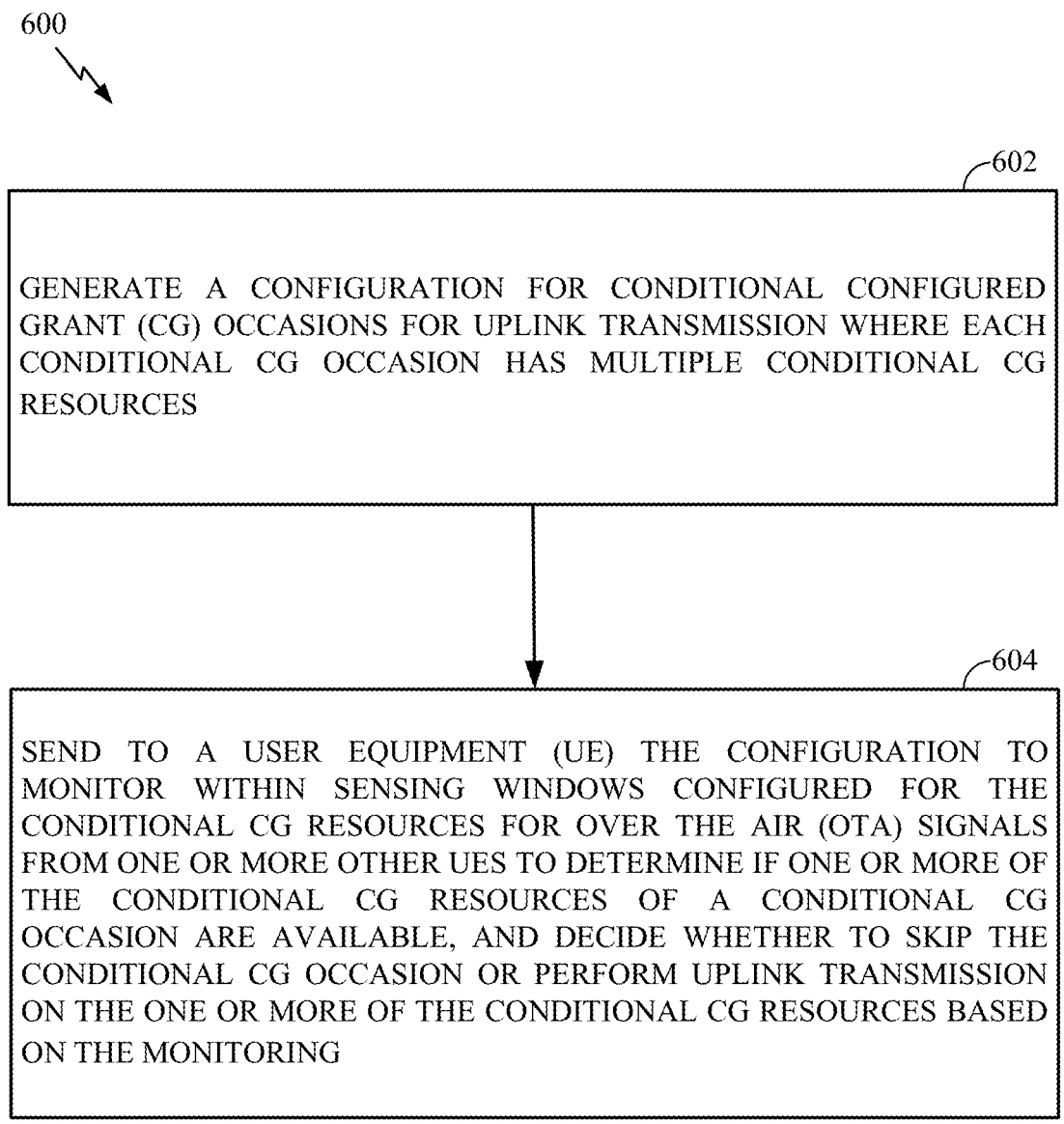
FIG. 6 illustrates example operations for wireless communication by a network entity, according to aspects of the present disclosure.

FIG. 6 is a flow diagram illustrating example operations 600 for wireless communication by a network entity that may be considered complementary to operations 500 of FIG. 5. For example, operations 600 may be performed by a BS (e.g., such as the BS 110a of FIG. 1 or FIG. 2) that sends a configuration for conditional CG occasions to a UE (e.g., such as the UE 120a in FIG. 1 or FIG. 2), which enables the UE to perform operations 500 of FIG. 5.

Operations 600 begin, at 602, by generating the configuration for the conditional CG occasions for uplink transmission. Each conditional CG occasion has multiple conditional CG resources. In certain aspects, the BS generates the configuration for the conditional CG occasions using a processor of the BS 110a shown in FIG. 1 or FIG. 2 and/or of the apparatus shown in FIG. 17.

At 604, the BS sends the configuration to the UE. In certain aspects, the BS sends the configuration to the UE using antenna(s) and transmitter/transceiver components of the BS 110a shown in FIG. 1 or FIG. 2 and/or of the apparatus shown in FIG. 17. The UE then monitors within sensing windows configured for the conditional CG resources, for OTA signals from one or more other UEs, to determine if one or more of the conditional CG resources of a conditional CG occasion are available. The UE then decides to skip the conditional CG occasion when the conditional CG resources are not available or performs uplink transmission on the one or more of the conditional CG resources when the conditional CG resources are available.

Operations 500 and 600 shown in FIGS. 5 and 6 are further described with reference to FIGS. 7-15.

Figure 7:
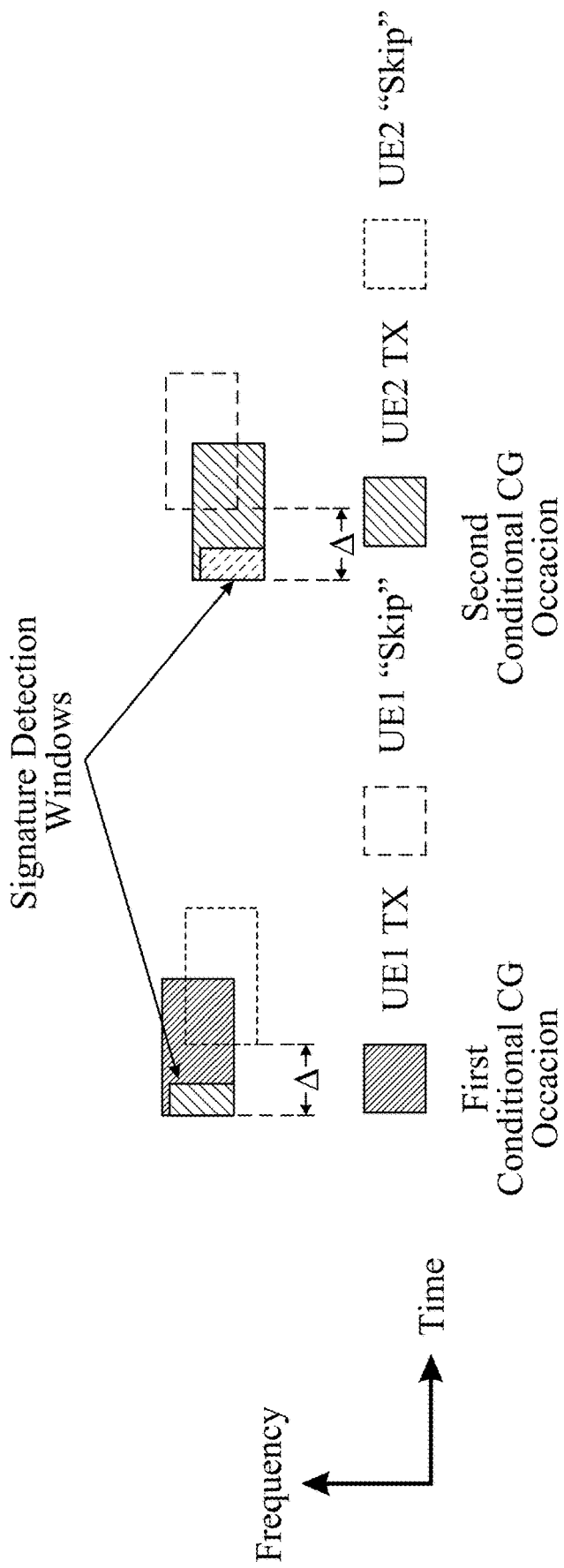
FIGS. 7-15 illustrate example conditional CG uplink transmission schemes, in accordance with certain aspects of the present disclosure.

FIG. 7 illustrates an example uplink transmission scheme, in which a first UE (UE 1) and a second UE (UE 2) are configured with conditional CG occasions.

As illustrated, UE 1 and UE 2 may perform signature-detection within a window to determine if conditional CG resources of these conditional CG occasions are available for uplink transmission. When all the conditional CG resources for a certain UE are available, that UE may perform uplink transmission on the conditional CG resources. When some of the conditional CG resources are not available (as determined based on the signature detection), the UE may skip the conditional CG occasion and/or avoid using partial conditional CG resources.

In the illustrated example, UE 2 skips its first conditional CG occasion due to the signature-detection (of UE 1) in the window. Similarly, UE 1 skips its second conditional CG due to the signature-detection (of UE 2) in the window.

In certain aspects, as in the example shown in FIG. 7, the first conditional CG occasion and the second conditional CG occasion of UE1 and UE2 may be arranged to interleave in time. This may be implemented to achieve channel access fairness for UE1 and UE2.

In certain aspects, UE1 and UE2 may have a processing time Δ. The processing time may indicate a reservation of a predetermined amount of time, which may be available to UE1 and UE2 for implementation of the signature-detection technique. In some examples, processing time may correspond to one slot and each conditional CG occasion may be configured with a slot aggregation.

Figure 8:
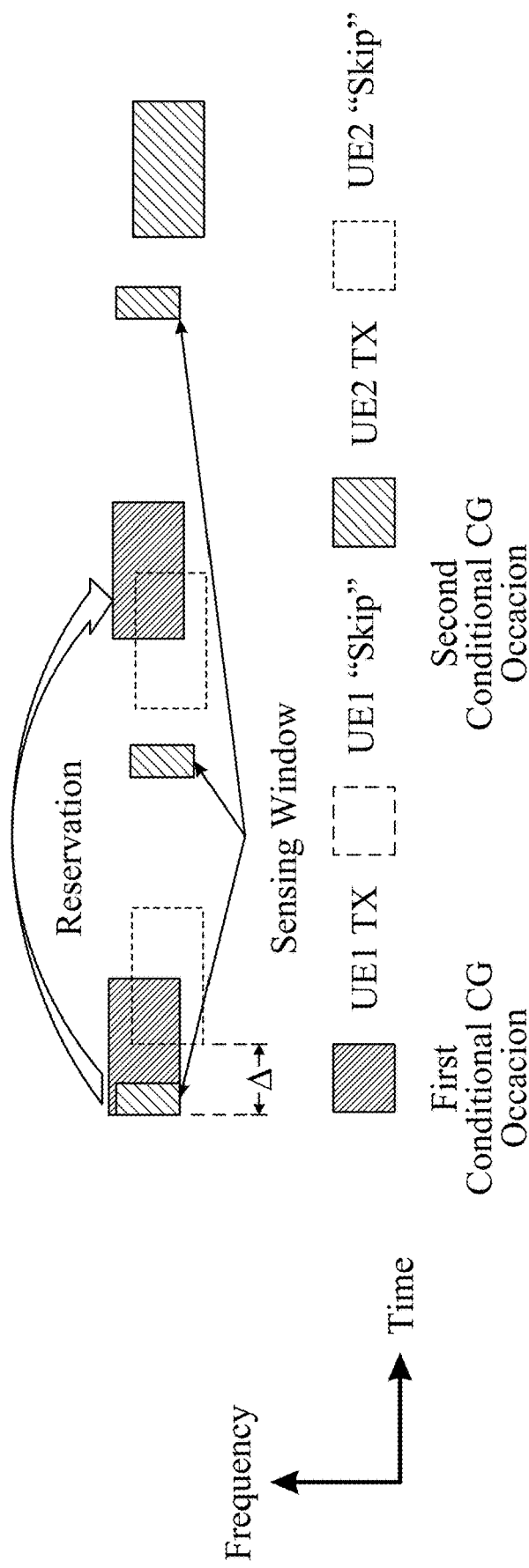

FIG. 8 illustrates another example uplink transmission scheme, in which UE 1 and UE 2 are configured for conditional CG occasions. Each conditional CG occasion may have conditional CG resources. Each conditional CG resource may be associated with a sensing window. The sensing window may be considered enhanced, as the UEs may also be configured to detect a reservation message within sensing windows configured for these conditional CG resources.

In the illustrated example, UE 2 detects a reservation message, from UE1, in sensing windows of a first conditional CG occasion. The reservation message may indicate a reservation of conditional CG resources of a second conditional CG occasion by UE 1. Thus, UE 2 may skip the second conditional CG occasion, even if it does not detect transmissions other UEs in sensing windows for the second CG occasion.

Figure 9:
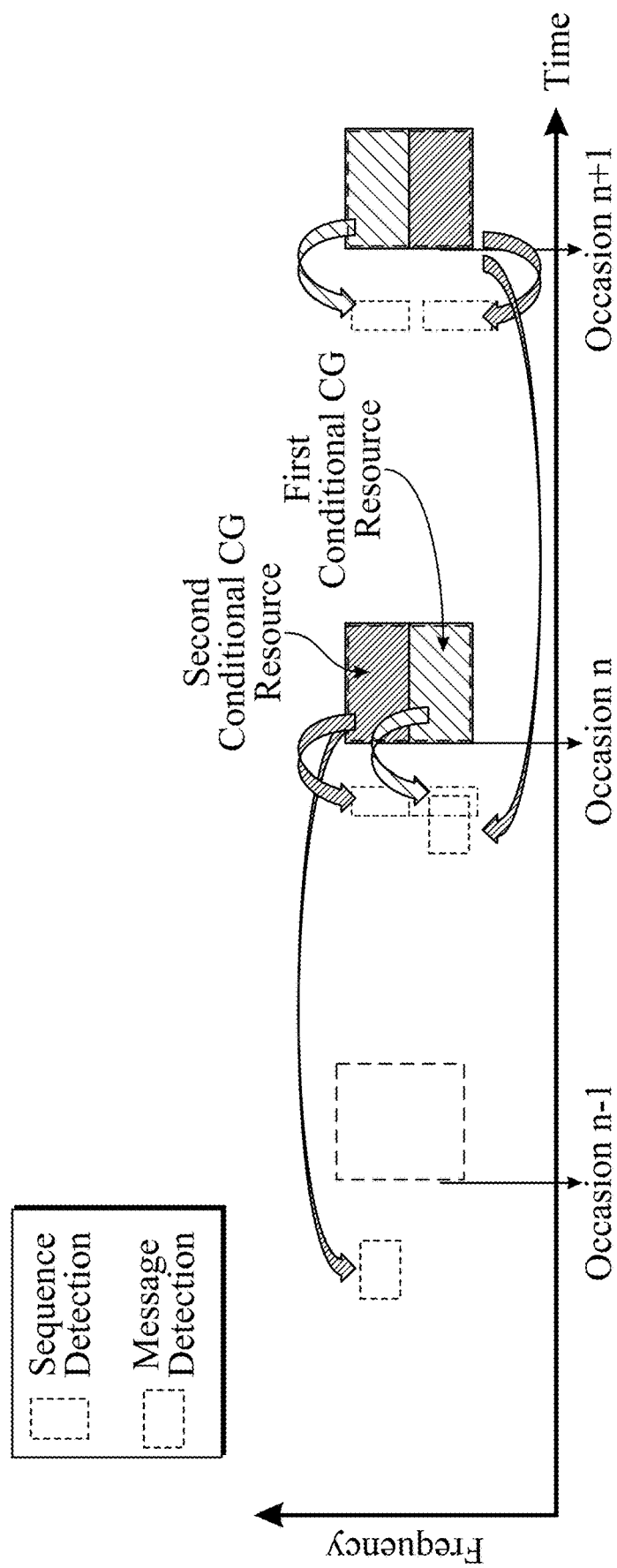

FIG. 9 illustrates an example uplink transmission scheme in a telecommunication system that may include a UE. The UE may be configured with conditional CG occasions for sending data over an interface such as Uu uplink interface. Each conditional CG occasion may be granted a resource pool. The resource pool may include two conditional CG resources such as a first conditional CG resource and a second conditional CG resource.

The first conditional CG resource and the second conditional CG resource may be configured with their individual sensing window. In some cases, the first conditional CG resource and/or the second conditional CG resource may be considered available to the UE only when there are over-the-air (OTA) signals (such as a valid OTA occupancy indication) within a corresponding sensing window of the first conditional CG resource and/or the second conditional CG resource. The OTA signal may correspond to a reservation message and/or a predefined sequence.

In one non-limiting example, as illustrated in FIG. 9, the first conditional CG resource may have a sensing window to detect a reservation message (or a reservation sequence) sent by another UE. When the UE detects a reservation message within the sensing window of the first conditional CG resource, the UE may skip a future conditional CG occasion, if conditional CG resources thereof are reserved by the reservation message.

In another non-limiting example, as illustrated in FIG. 9, the second conditional CG resource may have a composite sensing window to detect a predefined sequence as well as a reservation message. If the UE detects the predefined sequence and/or the reservation message within the composite sensing window, the UE determines that the second conditional CG resource and/or some other conditional CG resource of a future conditional CG occasion is not available.

Figure 10:
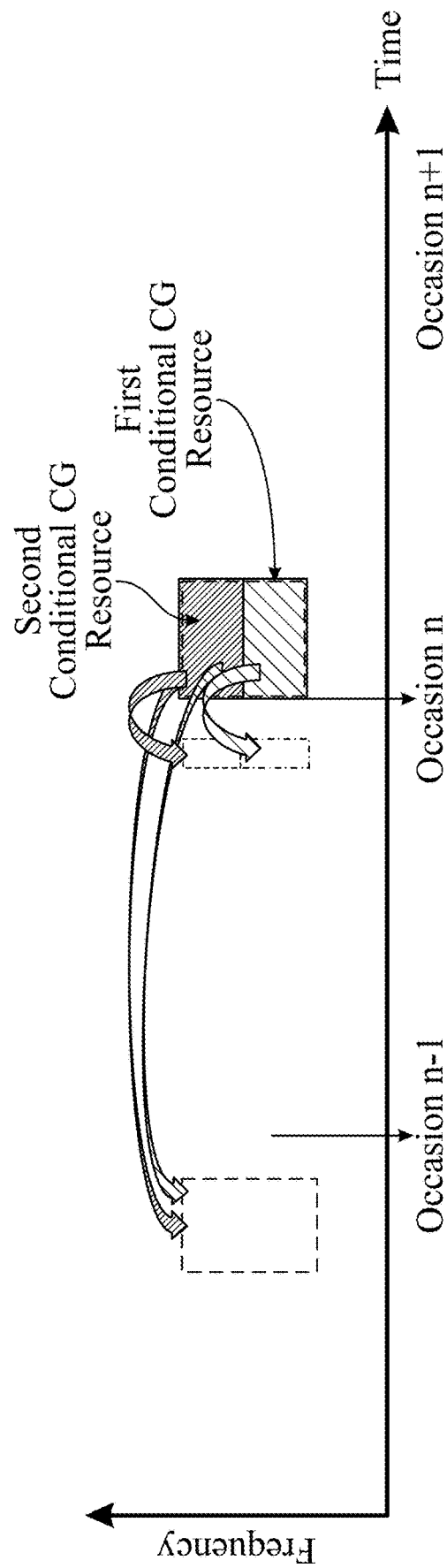

In certain aspects, as illustrated in FIG. 10, a first conditional CG resource and a second conditional CG resource within a resource pool of a conditional CG occasion may share a same sensing window. A UE may monitor this shared sensing window associated with the first conditional CG resource and the second conditional CG resource to detect a reservation message from another UE.

Figure 11:
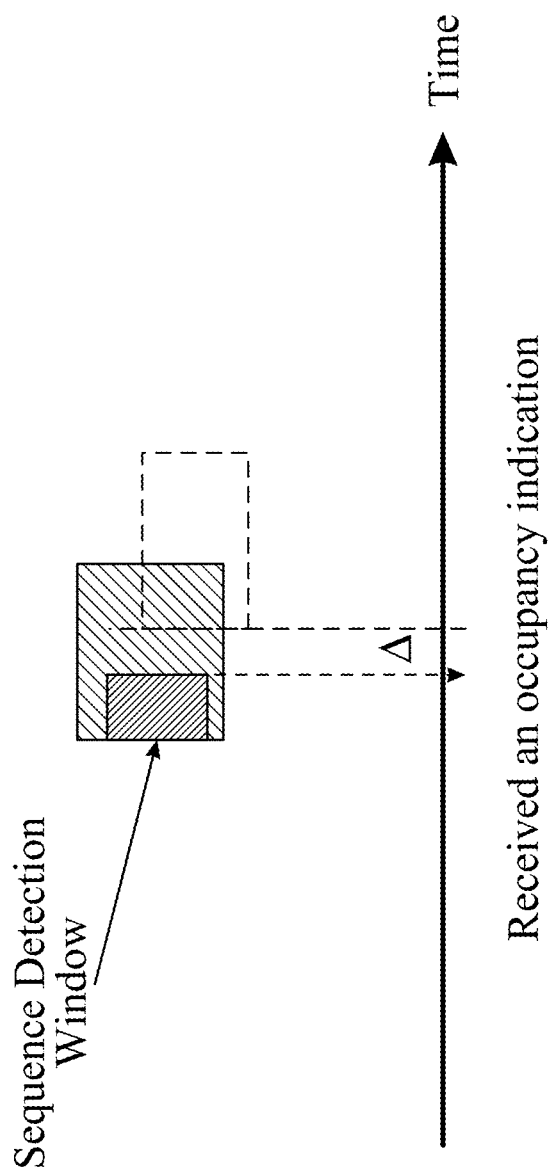

FIG. 11 illustrates an example of occupancy indication from sequence detection. A UE may make availability determination of conditional CG resource by monitoring a sensing window of the conditional CG resource. The sensing window may correspond to a sequence detection window for detecting a predefined sequence. The predefined sequence may be a demodulation reference signal (DMRS) sequence/antenna port. When the UE may detect the predefined sequence within the sensing window of the conditional CG resource, the UE may determine that the conditional CG resource is not available for uplink transmission.

In one non-limiting example, as illustrated in FIG. 11, the UE may monitor the sequence detection window of the conditional CG resource. The UE may detect the predefined sequence within the sequence detection window. The UE may perform an energy detection (ED) to determine an energy value corresponding to the predefined sequence detected within the sequence detection window. The UE may compare the energy value of the predefined sequence with a predetermined threshold value, which may be configured by a BS. The BS may dynamically optimize tunable predetermined threshold value. In certain aspects, the predetermined threshold value may depend on a priority for uplink transmission such that a lower priority may result in a smaller threshold value. When the UE may determine that the energy value of the predefined sequence is more than the predetermined threshold value, the UE may determine that the conditional CG resource is occupied or not available for uplink transmission.

Figure 12:
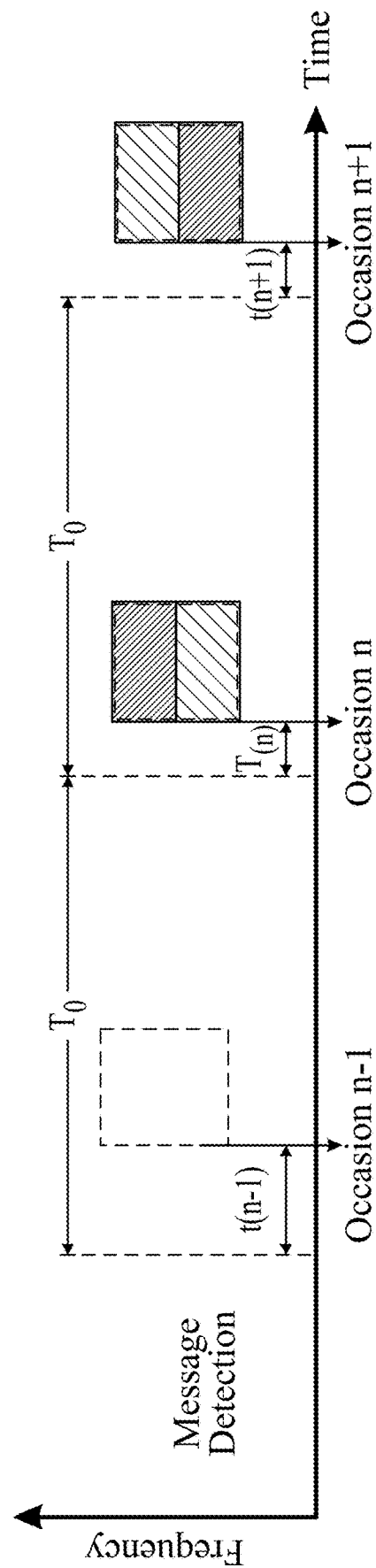

FIG. 12 illustrates an example of interleaved CG occasions, with time varying offsets, in accordance with aspects of the present disclosure. In this example, a CG UE is configured with CG occasions with a periodicity $T_0$ and a time varying offset $t(n)$. In certain aspects, the periodicity and the time varying offset may be updated using on-line adaptive updating technique. The timing varying offset may include two options. In one non-limiting example option, one or more timing varying offset sequences may be hard coded in a specification. In another non-limiting example option, a random hash function may include identification (ID) of UE, timing, and random seed as an input. The timing varying offset may be set and/or updated by a downlink control information (DCI) for a type2 CG. In certain aspects, the UE may determine a location of conditional CG resources for a certain conditional CG occasion based on the time varying offset.

Figure 13:
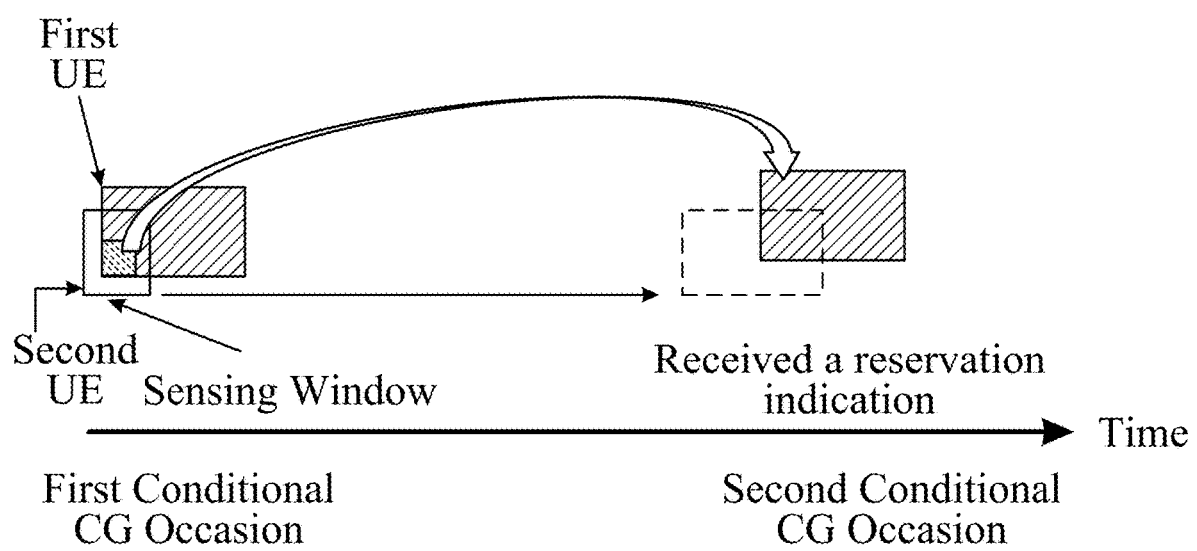

FIG. 13 illustrates an example of occupancy indication from a reservation message. In this case, a sensing window may correspond to a predefined reservation message window for detecting the reservation message. The reservation message may be a L1 reservation message with a predetermined format. The reservation message may indicate reservation of resources in one or more conditional CG resources of a future conditional CG occasion. When UEs may detect the reservation message within the sensing window of the conditional CG resource, UEs may determine that some conditional CG resources of the future conditional CG occasion are reserved.

In one non-limiting example, as illustrated in FIG. 13, a first UE may send a reservation message in a first conditional CG occasion. The reservation message may include information associated with reservation of some conditional CG resources of a second conditional CG occasion by the first UE. The second UE may monitor a sensing window of the first conditional CG resource. The second UE may detect the reservation message within the sensing window. This may block the second UE from accessing the second conditional CG occasion (and the second UE may skip this second conditional CG occasion).

In certain aspects, UEs may be configured to send L1 reservation message (e.g., as CG uplink control information (UCI)) for high priority traffics. In certain aspects, the reservation message may include a time domain resource allocation (TDRA), a frequency domain resource allocation (FDRA), or other related fields, such as a priority indicated in a sidelink control information (SCI). In certain aspects, the FDRA indicated in the reservation message may be different from a FDRA used for transmitting the reservation message.

Figure 14:
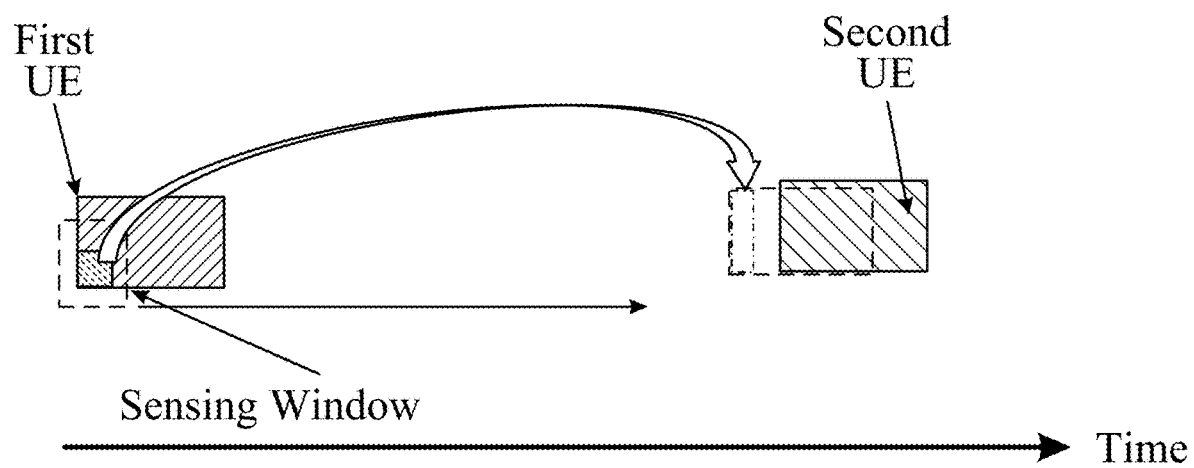

FIG. 14 illustrates an example of occupancy indication from a reservation message. In this case, after detecting the reservation message (reserving conditional CG resources in a subsequent conditional CG occasion), a UE may also validate the reservation of these conditional CG resources with a sequence-based detection, which may allow the UE to detect if/when previously reserved conditional CG resources are not used.

For example, after making some reservation, a first UE may receive an acknowledgment (ACK) signal from a BS for uplink transmission. The first UE may then decide to give up this reservation. By performing a validation check, a second UE may determine that some of the previously reserved conditional CG resources by the first UE are actually available, which may help avoid waste of conditional CG resources. The second UE may perform a sequence-based detection to validate this reservation. If the second UE does not detect the predefined sequence, the second UE may conclude that the previously reserved conditional CG resources are available. The second UE may perform uplink transmission on these conditional CG resources.

Figure 15:
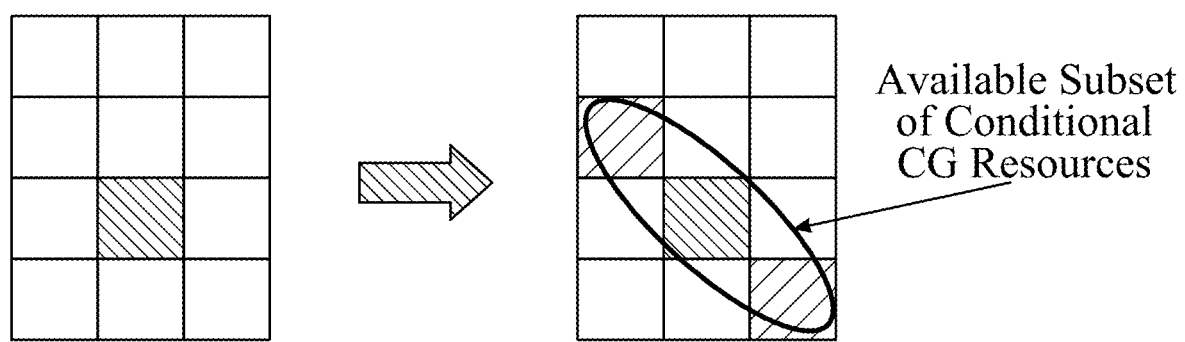

FIG. 15 illustrates how a UE may have multiple CG opportunities within a resource pool associated with a conditional CG occasion. The conditional CG occasion may have a resource pool. The resource pool may include conditional CG resources. The UE may determine whether the conditional CG resources are available for uplink transmission. The UE may determine that some of these conditional CG resources are not available. To compensate for the conditional un-availability of some of these conditional CG resources, the UE may have multiple opportunities for selection of available conditional CG resources for uplink transmission.

In one non-limiting example, as illustrated in FIG. 15, the UE may select available conditional CG resources in two steps. In a first step, the UE may identify a subset of the conditional CG resources for the conditional CG occasion that are available. For instance, the UE may execute a pseudo-random selection technique to determine an available subset of M conditional CG resources that are not blocked by an occupancy indication corresponding to another UE. The available subset of M conditional CG resources may be less than or equal to L, which is a size of the resource pool associated with the conditional CG occasion. In a second step, the UE may randomly select one conditional CG resource from the subset of the conditional CG resources to perform uplink transmission. This may result in a higher implementation cost by a BS (e.g., such as the BS 110a of FIG. 1 or FIG. 2) due to more blind decoding efforts.

In certain aspects, the UE may determine indices corresponding to the subset of the conditional CG resources by running hashing functions corresponding to the subset of the conditional CG resources in parallel. For example, the UE may determine the indices corresponding to the available subset of M conditional CG resources by running M hashing functions in parallel. The UE may execute a hashing function, which may generate multiple-byte output (such as CRC-32 hashing with 4-byte output) and then apply MOD (L) over respective bit-segments. L may be a dimension of the resource pool for the conditional CG occasion.

In certain aspects, the UE may receive from the BS, a first retransmission command. A size of the subset of the conditional CG resources that may be available for retransmission may be dynamically increased based on the first retransmission command. In certain aspects, the UE may receive from the BS, a first acknowledgement. The size of the subset of the conditional CG resources that may be available for retransmission may be decreased based on the first acknowledgement.

In certain aspects, the UE may receive from the BS, a second retransmission command. A probability of the UE determining the subset of the conditional CG resources that are available for the retransmission may be increased based on the second retransmission command. In certain aspects, the UE may receive from the BS, a second acknowledgement. The probability of the UE determining the subset of the conditional CG resources that are available for the retransmission may be decreased based on the second acknowledgement.

Techniques discussed here provide numerous advantages such as saving power. For instance, when a UE may determine that some conditional CG resources for a conditional CG occasion are not available based on an occupancy indication from other UEs, the UE may skip this conditional CG occasion and not waste its transmission processing power for sending data over this collided conditional CG occasion. Such power saving may be substantial for UEs such as cell edge UEs that may need to transmit with maximum power over multiple opportunities (such as slot aggregations). In addition, UEs may not need to execute a deep listening technique, which is very power consuming to prevent collision with other remote UEs since the BS may rely on multiple input multiple output (MIMO) processing to separate such well-separated pair of UEs.

Figure 16:
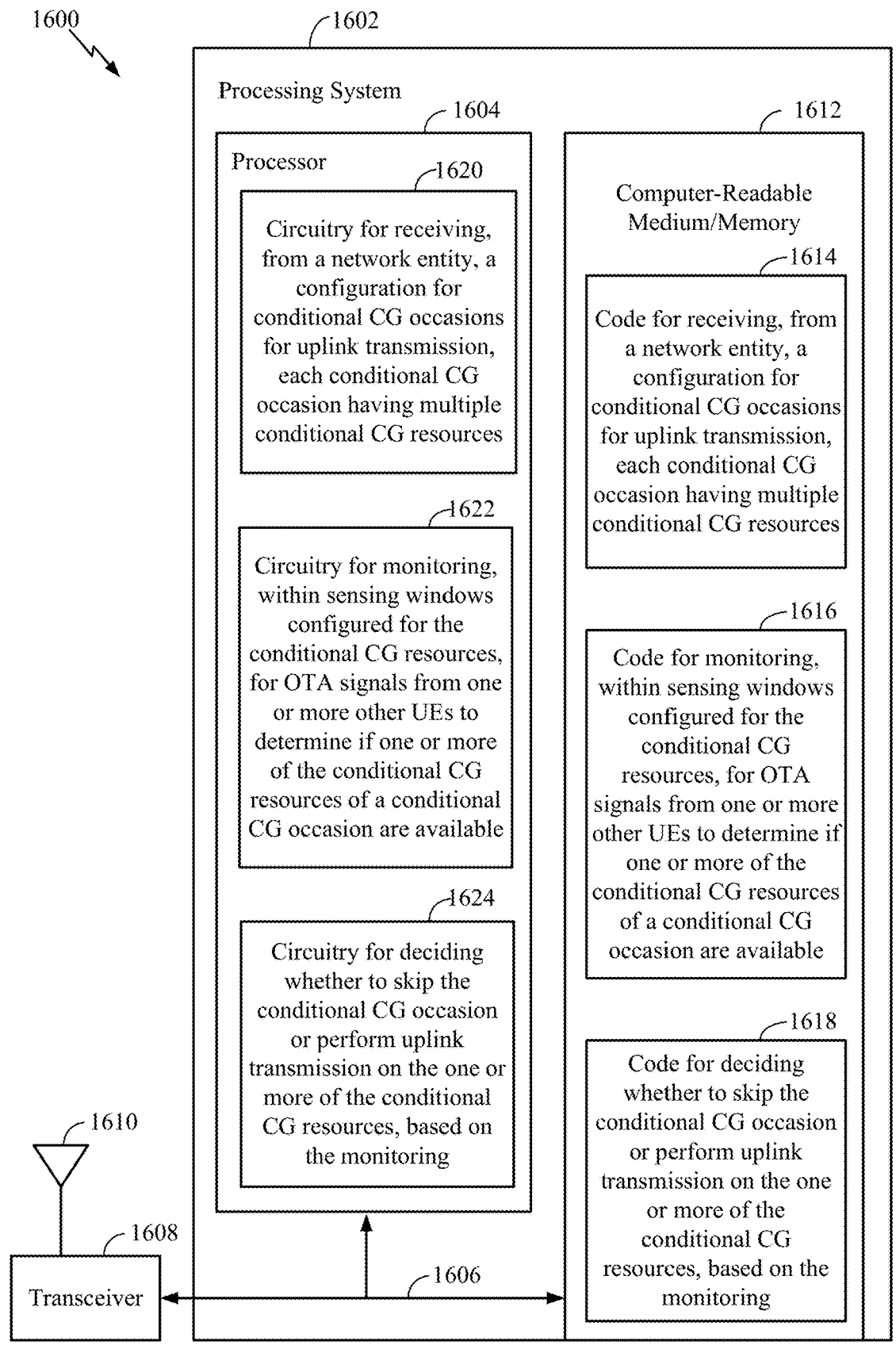
FIG. 16 illustrates a communications device that may include various components configured to perform operations for techniques disclosed herein, according to aspects of the present disclosure.

FIG. 16 illustrates a communications device 1600 that may include various components (e.g., corresponding to means-plus-function components) configured to perform operations for techniques disclosed herein, such as the operations illustrated in FIG. 5. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 is configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 5, or other operations for performing the various techniques discussed herein for conditional CG based uplink transmission. In certain aspects, computer-readable medium/memory 1612 stores code 1614 for receiving, code 1616 for monitoring, and code 1618 for deciding. The code 1614 for receiving may include code for receiving, from a network entity, a configuration for conditional CG occasions for uplink transmission where each conditional CG occasion may have multiple conditional CG resources. The code 1616 for monitoring may include code for monitoring, within sensing windows configured for the conditional CG resources, for OTA signals from one or more other UEs to determine if one or more of the conditional CG resources of a conditional CG occasion are available. The code 1618 for deciding may include code for deciding whether to skip the conditional CG occasion or perform uplink transmission on the one or more of the conditional CG resources, based on the monitoring.

The processor 1614 may include circuitry configured to implement the code stored in the computer-readable medium/memory 1612, such as for performing the operations illustrated in FIG. 5, as well as other operations for performing the various techniques discussed herein for conditional CG based uplink transmission. For example, the processor 1604 includes circuitry 1620 for receiving, circuitry 1622 for monitoring, and circuitry 1624 for deciding. The circuitry 1620 for receiving may include circuitry for receiving, from a network entity, a configuration for conditional CG occasions for uplink transmission where each conditional CG occasion may have multiple conditional CG resources. The circuitry 1622 for monitoring may include circuitry for monitoring, within sensing windows configured for the conditional CG resources, for OTA signals from one or more other UEs to determine if one or more of the conditional CG resources of a conditional CG occasion are available. The circuitry 1624 for deciding may include circuitry for deciding whether to skip the conditional CG occasion or perform uplink transmission on the one or more of the conditional CG resources, based on the monitoring.

Figure 17:
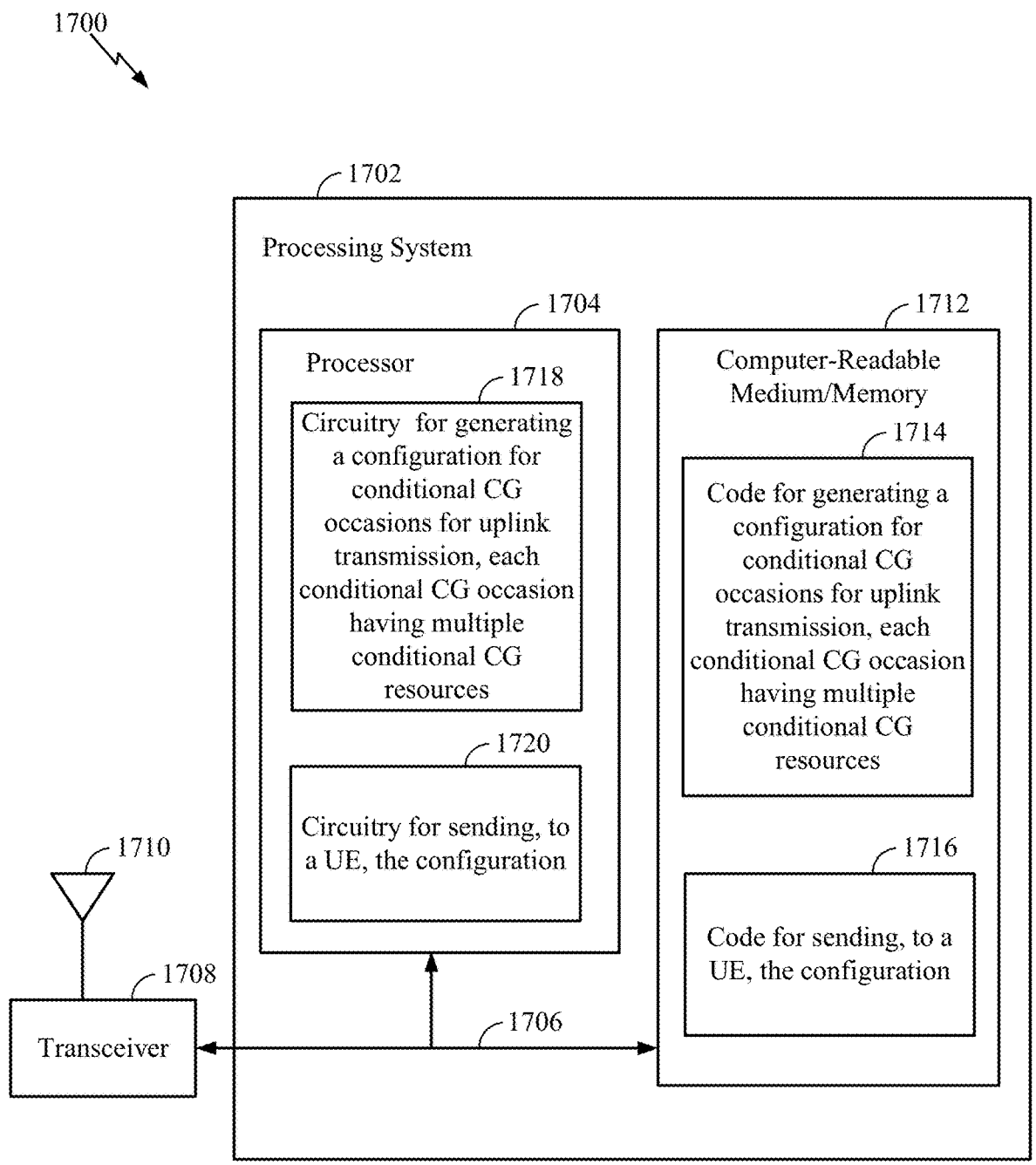
FIG. 17 illustrates a communications device that may include various components configured to perform operations for techniques disclosed herein, according to aspects of the present disclosure.

FIG. 17 illustrates a communications device 1700 that may include various components (e.g., corresponding to means-plus-function components) configured to perform operations for the techniques disclosed herein, such as the operations illustrated in FIG. 6. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 6, or other operations for performing the various techniques discussed herein for conditional CG based uplink transmission. In certain aspects, computer-readable medium/memory 1712 stores code 1714 for generating and code 1716 for sending. The code 1714 for generating may include code for generating a configuration for conditional CG occasions for uplink transmission where each conditional CG occasion may have multiple conditional CG resources. The code 1716 for sending may include code for sending to a UE the configuration to: monitor within sensing windows configured for the conditional CG resources, for OTA signals from one or more other UEs to determine if one or more of the conditional CG resources of a conditional CG occasion are available; and decide whether to skip the conditional CG occasion or perform uplink transmission on the one or more of the conditional CG resources, based on the monitoring.

The processor 1704 may include circuitry configured to implement the code stored in the computer-readable medium/memory 1712, such as for performing the operations illustrated in FIG. 6, as well as other operations for performing the various techniques discussed herein for conditional CG based uplink transmission. For example, the processor 1704 includes circuitry 1718 for generating and circuitry 1720 for sending. The circuitry 1718 for generating may include circuitry for generating a configuration for conditional CG occasions for uplink transmission where each conditional CG occasion may have multiple conditional CG resources. The circuitry 1720 for sending may include circuitry for sending to a UE the configuration to: monitor within sensing windows configured for the conditional CG resources, for OTA signals from one or more other UEs to determine if one or more of the conditional CG resources of a conditional CG occasion are available; and decide whether to skip the conditional CG occasion or perform uplink transmission on the one or more of the conditional CG resources, based on the monitoring.

Example Aspects

In a first aspect, a method for wireless communications by a UE comprises receiving, from a network entity, a configuration for conditional CG occasions for uplink transmission, each conditional CG occasion having multiple conditional CG resources; monitoring, within sensing windows configured for the conditional CG resources, for OTA signals from one or more other UEs to determine if one or more of the conditional CG resources of a conditional CG occasion are available; and deciding whether to skip the conditional CG occasion or perform uplink transmission on the one or more of the conditional CG resources, based on the monitoring.

In a second aspect, alone or in combination with the first aspect, the UE determines that a conditional CG resource is unavailable if the UE detects, within a corresponding sensing window, at least one of a predefined sequence or a reservation message, sent by another UE, reserving resources in the conditional CG resource of a future conditional CG occasion.

In a third aspect, alone or in combination with one or more of the first and second aspects, the multiple conditional CG resources share a same sensing window.

In a fourth aspect, alone or in combination with one or more of the first through third aspects, the predefined sequence is a DMRS sequence.

In a fifth aspect, alone or in combination with one or more of the first through fourth aspects, the UE determines that the conditional CG resource is unavailable when the UE detects within the corresponding sensing window that an energy of the predefined sequence is more than a threshold value.

In a sixth aspect, alone or in combination with one or more of the first through fifth aspects, the configuration indicates a periodicity and a timing varying offset.

In a seventh aspect, alone or in combination with one or more of the first through sixth aspects, determining a location, in time, of the conditional CG resources for a given conditional CG occasion based, at least in part, on the time varying offset.

In an eighth aspect, alone or in combination with one or more of the first through seventh aspects, the reservation message indicates at least one of a TDRA, a FDRA, or a priority indicated in a SCI.

In a ninth aspect, alone or in combination with one or more of the first through eighth aspects, the FDRA indicated in the reservation message is different from a FDRA used for transmitting the reservation message.

In a tenth aspect, alone or in combination with one or more of the first through ninth aspects, after detecting the reservation message, validating a reservation of the conditional CG resource with a sequence-based detection.

In an eleventh aspect, alone or in combination with one or more of the first through tenth aspects, performing a pseudo random selection to identify a subset of the conditional CG resources that are available based on the monitoring and randomly selecting one conditional CG resource from the subset of the conditional CG resources to perform uplink transmission.

In a twelfth aspect, alone or in combination with one or more of the first through eleventh aspects, determining indices corresponding to the subset of the conditional CG resources by running hashing functions corresponding to the subset of the conditional CG resources in parallel.

In a thirteenth aspect, alone or in combination with one or more of the first through twelfth aspects, receiving from the network entity a retransmission command wherein a size of the subset of the conditional CG resources that are available for the retransmission is dynamically increased based on the retransmission command.

In a fourteenth aspect, alone or in combination with one or more of the first through thirteenth aspects, receiving from the network entity a retransmission command wherein a probability of the UE determining the subset of the conditional CG resources that are available for the retransmission is increased based on the retransmission command.

In a fifteenth aspect, a method for wireless communications by a network entity comprises generating a configuration for conditional CG occasions for uplink transmission, each conditional CG occasion having multiple conditional CG resources; and sending to a UE the configuration to: monitor within sensing windows configured for the conditional CG resources, for OTA signals from one or more other UEs to determine if one or more of the conditional CG resources of a conditional CG occasion are available; and decide whether to skip the conditional CG occasion or perform uplink transmission on the one or more of the conditional CG resources, based on the monitoring.

In a sixteenth aspect, alone or in combination with the fifteenth aspect, the UE determines that a conditional CG resource is unavailable if the UE detects, within a corresponding sensing window, at least one of: a predefined sequence; or a reservation message, sent by another UE, reserving resources in the conditional CG resource of a future conditional CG occasion.

In a seventeenth aspect, alone or in combination with one or more of the fifteenth through sixteenth aspects, the multiple conditional CG resources share a same sensing window.

In an eighteenth aspect, alone or in combination with one or more of the fifteenth through seventeenth aspects, the predefined sequence is a DMRS sequence.

In a nineteenth aspect, alone or in combination with one or more of the fifteenth through eighteenth aspects, the reservation message indicates at least one of a TDRA, a FDRA, or a priority indicated in a SCI.

In a twentieth aspect, alone or in combination with one or more of the fifteenth through nineteenth aspects, the FDRA indicated in the reservation message is different from a FDRA used for transmitting the reservation message.

In a twenty-one aspect, alone or in combination with one or more of the fifteenth through twentieth aspects, sending to the UE a retransmission command wherein a size of the conditional CG resources that are available for the retransmission is dynamically increased based on the retransmission command.

In a twenty-second aspect, alone or in combination with one or more of the fifteenth through twenty-first aspects, sending to the UE a retransmission command wherein a probability of the UE determining the conditional CG resources that are available for the retransmission is increased based on the retransmission command.

In a twenty-third aspect, alone or in combination with one or more of the fifteenth through twenty-second aspects, the UE is configured to send its own reservation messages at a predefined reservation message window.

In a twenty-fourth aspect, alone or in combination with one or more of the fifteenth through twenty-second aspects, the UE is configured to send its own reservation messages at a predefined reservation message window only for traffic of a certain priority.

In a twenty-fifth aspect, an apparatus for wireless communications by a UE, comprises a memory; and a processor coupled with the memory, the processor configured to: receive, from a network entity, a configuration for conditional CG occasions for uplink transmission, each conditional CG occasion having multiple conditional CG resources; monitor, within sensing windows configured for the conditional CG resources, for OTA signals from one or more other UEs to determine if one or more of the conditional CG resources of a conditional CG occasion are available; and decide whether to skip the conditional CG occasion or perform uplink transmission on the one or more of the conditional CG resources, based on the monitoring.

In a twenty-sixth aspect, alone or in combination with the twenty-fifth aspect, the processor determines that a conditional CG resource is unavailable if the processor detects within a corresponding sensing window at least one of a predefined sequence or a reservation message sent by another UE reserving resources in the conditional CG resource of a future conditional CG occasion.

In a twenty-seventh aspect, alone or in combination with one or more of the twenty-fifth and twenty-sixth aspects, the multiple conditional CG resources share a same sensing window.

In a twenty-eighth aspect, an apparatus for wireless communications by a network entity comprises a memory; and a processor coupled with the memory, the processor configured to: generate a configuration for conditional CG occasions for uplink transmission, each conditional CG occasion having multiple conditional CG resources; and send, to a UE, the configuration to: monitor within sensing windows configured for the conditional CG resources, for OTA signals from one or more other UEs to determine if one or more of the conditional CG resources of a conditional CG occasion are available; and decide whether to skip the conditional CG occasion or perform uplink transmission on the one or more of the conditional CG resources, based on the monitoring.

In a twenty-ninth aspect, alone or in combination with the twenty-eighth aspect, the processor is further configured to send to the UE a retransmission command, wherein a size of the conditional CG resources that are available for the retransmission is dynamically increased based on the retransmission command.

In a thirtieth aspect, alone or in combination with one or more of the twenty-eighth and twenty-ninth aspects, the processor is further configured to send the UE a retransmission command, wherein a probability of the UE determining the conditional CG resources that are available for the retransmission is increased based on the retransmission command.

Additional Considerations

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   receiving, from a network entity, a configuration for conditional configured grant (CG) occasions for uplink transmission, each conditional CG occasion having multiple conditional CG resources;
   monitoring, within sensing windows configured for the conditional CG resources, for signals from one or more other UEs to determine availability of one or more of the conditional CG resources of a conditional CG occasion, wherein the one or more of the conditional CG resources are not available when a predefined sequence of the signals is detected within the sensing windows;
   deciding to perform uplink transmission on the one or more of the conditional CG resources when the one or more of the conditional CG resources are available;
   performing a pseudo random selection to identify a subset of the conditional CG resources that are available based on the monitoring; and
   randomly selecting one conditional CG resource from the subset of the conditional CG resources to perform the uplink transmission.

2. The method of claim 1, wherein:
   the UE determines that a conditional CG resource is unavailable if the UE detects, within a corresponding sensing window, a reservation message, sent by another UE, reserving resources in the conditional CG resource of a future conditional CG occasion.

3. The method of claim 1, wherein the multiple conditional CG resources share a same sensing window.

4. The method of claim 1, wherein the predefined sequence is a demodulation reference signal (DMRS) sequence.

5. The method of claim 1, wherein the UE determines that a conditional CG resource is unavailable when the UE detects within the corresponding sensing window that an energy of the predefined sequence is more than a threshold value.

6. The method of claim 1, wherein the configuration indicates a periodicity and a timing varying offset.

7. The method of claim 6, further comprising:
   determining a location, in time, of the conditional CG resources for a given conditional CG occasion based, at least in part, on the time varying offset.

8. The method of claim 2, wherein the reservation message indicates at least one of: a time domain resource allocation (TDRA), a frequency domain resource allocation (FDRA), or a priority indicated in a sidelink control information (SCI).

9. The method of claim 8, wherein the FDRA indicated in the reservation message is different from a FDRA used for transmitting the reservation message.

10. The method of claim 2, further comprising:
after detecting the reservation message, validating a reservation of the conditional CG resource with a sequence-based detection.

11. The method of claim 1, further comprising:
determining indices corresponding to the subset of the conditional CG resources by running hashing functions corresponding to the subset of the conditional CG resources in parallel.

12. The method of claim 1, further comprising:
receiving, from the network entity, a retransmission command, wherein a size of the subset of the conditional CG resources that are available for the retransmission is dynamically increased based on the retransmission command.

13. The method of claim 1, further comprising:
receiving, from the network entity, a retransmission command, wherein a probability of the UE determining the subset of the conditional CG resources that are available for the retransmission is increased based on the retransmission command.

14. A method for wireless communications by a network entity, comprising:
generating a configuration for conditional configured grant (CG) occasions for uplink transmission, each conditional CG occasion having multiple conditional CG resources;
sending, to a user equipment (UE), the configuration to:
monitor within sensing windows configured for the conditional CG resources, for signals from one or more other UEs to determine availability of one or more of the conditional CG resources of a conditional CG occasion, wherein the one or more of the conditional CG resources are not available when a predefined sequence of the signals is detected within the sensing windows; and
decide to perform uplink transmission on the one or more of the conditional CG resources when the one or more of the conditional CG resources are available; and
sending, to the UE, a retransmission command, wherein a size of the conditional CG resources that are available for the retransmission is dynamically increased based on the retransmission command.

15. The method of claim 14, wherein:
the UE determines that a conditional CG resource is unavailable if the UE detects, within a corresponding sensing window a reservation message, sent by another UE, reserving resources in the conditional CG resource of a future conditional CG occasion.

16. The method of claim 14, wherein the multiple conditional CG resources share a same sensing window.

17. The method of claim 14, wherein the predefined sequence is a demodulation reference signal (DMRS) sequence.

18. The method of claim 15, wherein the reservation message indicates at least one of: a time domain resource allocation (TDRA), a frequency domain resource allocation (FDRA), or a priority indicated in a sidelink control information (SCI).

19. The method of claim 18, wherein the FDRA indicated in the reservation message is different from a FDRA used for transmitting the reservation message.

20. The method of claim 14, wherein a probability of the UE determining the conditional CG resources that are available for the retransmission is increased based on the retransmission command.

21. The method of claim 15, wherein the UE is configured to send reservation messages at a predefined reservation message window.

22. The method of claim 15, wherein the UE is configured to send reservation messages at a predefined reservation message window only for traffic of a certain priority.

23. An apparatus for wireless communications by a user equipment (UE), comprising:
a memory; and
a processor coupled with the memory, the processor configured to:
receive, from a network entity, a configuration for conditional configured grant (CG) occasions for uplink transmission, each conditional CG occasion having multiple conditional CG resources;
monitor, within sensing windows configured for the conditional CG resources, for signals from one or more other UEs to determine availability of one or more of the conditional CG resources of a conditional CG occasion, wherein the one or more of the conditional CG resources are not available when a predefined sequence of the signals is detected within the sensing windows;
decide to perform uplink transmission on the one or more of the conditional CG resources when the one or more of the conditional CG resources are available;
perform a pseudo random selection to identify a subset of the conditional CG resources that are available based on the monitoring; and
randomly select one conditional CG resource from the subset of the conditional CG resources to perform uplink transmission.

24. The apparatus of claim 23, wherein the processor determines that a conditional CG resource is unavailable if the processor detects, within a corresponding sensing window,
a reservation message, sent by another UE, reserving resources in the conditional CG resource of a future conditional CG occasion.

25. The apparatus of claim 23, wherein the multiple conditional CG resources share a same sensing window.

26. An apparatus for wireless communications by a network entity, comprising:
a memory; and
a processor coupled with the memory, the processor configured to:
generate a configuration for conditional configured grant (CG) occasions for uplink transmission, each conditional CG occasion having multiple conditional CG resources;
send, to a user equipment (UE), the configuration to:
monitor within sensing windows configured for the conditional CG resources, for signals from one or more other UEs to determine availability of one or more of the conditional CG resources of a conditional CG occasion, wherein the one or more of the conditional CG resources are not available when a predefined sequence of the signals is detected within the sensing windows; and decide to perform uplink transmission on the one or more of the conditional CG resources when the one or more of the conditional CG resources are available; and send, to the UE, a retransmission command, wherein a size of the conditional CG resources that are available for the retransmission is dynamically increased based on the retransmission command.

27. The apparatus of claim 26, wherein
a probability of the UE determining the conditional CG resources that are available for the retransmission is increased based on the retransmission command.

* * * * *